(12) United States Patent
Phillips et al.

(10) Patent No.: US 9,444,856 B2
(45) Date of Patent: Sep. 13, 2016

(54) SYSTEM AND METHOD FOR MANAGING ADJACENT CHANNELS IN AN ADAPTIVE STREAMING ENVIRONMENT

(71) Applicant: Ericsson Television Inc, Duluth, GA (US)

(72) Inventors: Chris Phillips, Hartwell, GA (US); Charles Hammett Dasher, Lawrenceville, GA (US); Robert Hammond Forsman, Sugar Hill, GA (US); Jennifer Ann Reynolds, Duluth, GA (US)

(73) Assignee: ERICSSON AB, Stockholm (SE)

( * ) Notice: Subject to any disclaimer, the term of this patent is extended or adjusted under 35 U.S.C. 154(b) by 137 days.

(21) Appl. No.: 14/037,078

(22) Filed: Sep. 25, 2013

(65) Prior Publication Data

US 2015/0089023 A1    Mar. 26, 2015

(51) Int. Cl.
*G06F 15/16* (2006.01)
*H04L 29/06* (2006.01)

(52) U.S. Cl.
CPC ....... *H04L 65/1089* (2013.01); *H04L 65/4084* (2013.01); *H04L 65/80* (2013.01)

(58) Field of Classification Search
CPC .............................. H04L 65/60; H04L 29/06
USPC ........................................................ 709/219
See application file for complete search history.

(56) References Cited

U.S. PATENT DOCUMENTS

| | | | |
|---|---|---|---|
| 6,154,767 A * | 11/2000 | Altschuler | G06F 17/30902 707/E17.12 |
| 6,725,267 B1 * | 4/2004 | Hoang | H04N 7/17318 348/E5.003 |
| 6,848,004 B1 | 1/2005 | Chang et al. | |
| 7,694,319 B1 * | 4/2010 | Hassell | H04N 5/44543 725/136 |
| 8,276,035 B1 * | 9/2012 | Savarese | H04L 1/0007 714/749 |
| 2003/0005386 A1 | 1/2003 | Bhatt | |
| 2004/0190552 A1 * | 9/2004 | Kim | H04L 1/005 370/469 |
| 2006/0140180 A1 * | 6/2006 | Du Breuil | H04L 67/2847 370/362 |
| 2007/0156845 A1 * | 7/2007 | Devanneaux | H04L 67/02 709/217 |
| 2008/0177754 A1 * | 7/2008 | Gill | G06F 17/30902 |
| 2009/0132636 A1 * | 5/2009 | Natanzon | G06F 19/321 709/201 |
| 2009/0199241 A1 * | 8/2009 | Unger | H04N 5/44543 725/41 |
| 2009/0292819 A1 | 11/2009 | Kandekar et al. | |
| 2009/0297123 A1 | 12/2009 | Virdi | |
| 2010/0150249 A1 | 6/2010 | Campana | |
| 2010/0177642 A1 * | 7/2010 | Sebastian | H04L 12/1859 370/248 |

(Continued)

FOREIGN PATENT DOCUMENTS

| JP | 2012-085216 A | 4/2012 |
|---|---|---|
| WO | WO 2008/054623 A1 | 5/2008 |

OTHER PUBLICATIONS

RGB Networks: "Comparing Adaptive HTTP Streaming Technologies". Nov. 2011.

*Primary Examiner* — Anthony Mejia

(57) ABSTRACT

A system and method for managing adjacent channels in an adaptive streaming environment. One or more adjacent channels may be defined for a client device relative to a current streaming channel, wherein the client device is configured to pre-fetch metadata and initialization information for the defined adjacent channels based on bandwidth conditions, buffer conditions, etc. When a channel is changed, the client device is operative to use the pre-fetched data to quickly obtain encoded media content for rendering.

24 Claims, 8 Drawing Sheets

(56) References Cited

U.S. PATENT DOCUMENTS

| | | | |
|---|---|---|---|
| 2011/0107219 A1* | 5/2011 | Jeon | G06Q 10/00 715/716 |
| 2011/0141933 A1* | 6/2011 | Kim | H04W 52/146 370/252 |
| 2011/0145278 A1* | 6/2011 | Maes | G06Q 10/06 707/769 |
| 2012/0054794 A1* | 3/2012 | Kim | G06F 3/0346 725/38 |
| 2012/0054803 A1* | 3/2012 | Lee | H04N 21/4755 725/56 |
| 2012/0084826 A1 | 4/2012 | Xu et al. | |
| 2012/0259994 A1 | 10/2012 | Gillies | |
| 2012/0320916 A1* | 12/2012 | Sebastian | H04N 21/2402 370/390 |
| 2013/0010793 A1 | 1/2013 | Tinsman | |
| 2013/0036234 A1 | 2/2013 | Pazos et al. | |
| 2013/0111058 A1 | 5/2013 | Smith et al. | |
| 2013/0145395 A1* | 6/2013 | Jeong | H04N 5/50 725/40 |
| 2013/0190026 A1* | 7/2013 | Agrawal | H04W 28/16 455/507 |
| 2013/0195205 A1 | 8/2013 | Wang et al. | |
| 2013/0243111 A1* | 9/2013 | Lee | H04L 25/022 375/285 |
| 2013/0246643 A1 | 9/2013 | Luby et al. | |
| 2014/0026052 A1* | 1/2014 | Thorwirth | G06F 3/01 715/721 |
| 2014/0157324 A1* | 6/2014 | Mao | H04N 21/2323 725/54 |
| 2014/0223502 A1 | 8/2014 | Doblmaier | |
| 2014/0325550 A1* | 10/2014 | Winograd | H04N 21/44236 725/19 |
| 2015/0032967 A1* | 1/2015 | Udayashankar | G06F 12/0862 711/137 |

\* cited by examiner

SYSTEM AND METHOD FOR MANAGING ADJACENT CHANNELS IN AN ADAPTIVE STREAMING ENVIRONMENT

CROSS-REFERENCE TO RELATED APPLICATION(S)

This application discloses subject matter that is related to the subject matter of the following U.S. patent application(s): (i) "SYSTEM AND METHOD FOR EFFECTUATING FAST CHANNEL CHANGE IN AN ADAPTIVE STREAMING ENVIRONMENT" (Ericsson Ref. No.: P40562-US1), application Ser. No. 14/037,160, filed Sep. 25, 2013, in the name(s) of Christopher Phillips, Charles Hammett Dasher, Mark Robertson, Robert Hammond Forsman and Jennifer Ann Reynolds, each of which is hereby incorporated by reference in its entirety.

FIELD OF THE DISCLOSURE

The present disclosure generally relates to communication networks. More particularly, and not by way of any limitation, the present disclosure is directed to a system and method for managing adjacent channels in an adaptive streaming environment.

BACKGROUND

Adaptive streaming is a popular means of non-traditional video delivery. Although there have been several advances, changing adaptively streamed content (e.g., from one stream or channel to another stream or channel) remains a cumbersome process in current implementations. As such, typical adaptive streaming techniques do not provide for a realistic or user-friendly "channel surfing" experience, thereby negatively impacting the quality of user enjoyment.

SUMMARY

The present patent disclosure is broadly directed to systems, methods, devices, apparatuses and associated computer-readable media for managing and effectuating fast channel changes (e.g., user-initiated "channel surfing" requests) in an adaptive streaming environment. One or more adjacent channels are adaptively defined relative to a current streaming channel that a client device is engaged on. The client device is configured to pre-fetch metadata and initialization information for the defined adjacent channels based on bandwidth conditions, buffer conditions, etc. When a channel is changed, the client device is operative to use the pre-fetched data to quickly obtain encoded media content for rendering.

In one aspect, an embodiment of a method operative in a streaming client device disposed in an adaptive streaming environment is disclosed. The claimed embodiment comprises, inter alia, monitoring at least a bandwidth condition relative to a network connection or a content distribution pipe between the streaming client device and a content delivery network and associated streaming server system. Based on the monitored conditions, one or more adjacent channels may be determined relative to a current streaming channel of the streaming client device. Responsive to the determination of the one or more adjacent channels, metadata information relative to the one or more adjacent channels is pre-fetched. Responsive to the pre-fetched metadata information, initialization information for the one or more adjacent channels is pre-fetched and stored locally on the streaming client device. If the current streaming channel is changed to a new streaming channel belonging to the one or more adjacent channels, the pre-fetched initialization information may be used to fetch encoded media content pertaining to the new streaming channel. In one variation, the claimed method further includes monitoring at least one of video buffer conditions and decoder processing conditions of the streaming client device, as well as determining the number of available decoders. In another variation, the pre-fetched metadata information of the adjacent channels comprises one or more manifest files generated in effectuating adaptive bit rate (ABR) streaming. The adjacent channels may be determined in a number of ways including, but not limited to, as a configurable number of consecutive channels above and/or below the current channel, based on users' favorite lists, and the like. In a still further variation, the claimed embodiment may comprise pre-fetching media content and immediately decoding the pre-fetched media content. If the current streaming channel is changed to a new streaming channel belong to one of the adjacent channels, the decoded media content of the adjacent channel is rendered promptly for display.

In another aspect, an embodiment of a client device is disclosed that comprises one or more processors, a bandwidth monitor and a streaming client module coupled to the one or more processors. The streaming client module may be configured to perform an embodiment of a method described hereinabove at least for purposes of managing adjacent channels in an adaptive streaming environment. In still further aspects, an embodiment of a non-transitory computer-readable medium containing instructions stored thereon is disclosed for performing one or more embodiments of the methods set forth above.

In a further aspect, an embodiment of a method operative at a streaming server system disposed in an adaptive streaming environment is disclosed. The claimed embodiment comprises, inter alia, always commencing streaming of the requested media content at a known media stream boundary (e.g., a stream access point or SAP) when a new stream of media content is requested by a client device (e.g., because of a channel change request). In an additional or alternative variation, the claimed embodiment comprises disabling error correction for transmission of the new stream to the client device for a select period of time, and initially transmitting the requested media content encoded at a select bit rate (e.g., the lowest bit rate possible) and segmented into shortest segments possible by a segmenter operating at the streaming server system.

In a related aspect, an embodiment of a streaming server system is disclosed that comprises, inter alia, one or more processors and an encoder coupled to the one or more processors that is operative to encode media content using multiple bit rates. A segmenter coupled to the one or more processors is configured to segment the encoded media content into segments of different size. A component is effectuated as part of the claimed streaming server system that is configured for commencing, under control of the one or more processors, streaming of media content at a SAP when a new stream of media content is requested by a client device disposed in an adaptive streaming environment. The streaming server system also comprises an error correction mechanism (e.g., a TCP-based error correction mechanism) that is configured to be selectively disabled, under control of the one or more processors, for a period of time during initial transmission of the new stream to the client device. A further component is effectuated as part of the claimed streaming server system that is configured for initially transmitting, under control of the one or more processors, the requested media content encoded at a select bit rate (e.g., the lowest bit rate possible) and segmented into shortest segments possible by the segmenter.

In a further related aspect, an embodiment of a method operative in a streaming client device for effectuating fast channel changes in an adaptive streaming environment is disclosed. The claimed embodiment comprises, inter alia, sending a request for transmission of media content encoded at a select bit rate (e.g., the lowest bit rate possible) when a new media content stream is requested, and decoding and rendering the received media content immediately regardless of a buffer state associated with the client device's video buffer. The claimed method further comprises sending a request for streaming media content encoded at higher bit rates during a ramp up period of time. In an additional or alternative variation, the claimed method may include sending a request for initially streaming media content segmented into shorter segments (e.g., for a specific period of time). In another related aspect, an embodiment of a client device is disclosed that comprises one or more processors, a channel change controller and a streaming client module coupled to the one or more processors. The streaming client module may be configured to perform an embodiment of a method described hereinabove at least for purposes of effectuating fast channel change requests in an adaptive streaming environment. In still further aspects, an embodiment of a non-transitory computer-readable medium containing instructions stored thereon is disclosed for performing one or more embodiments of the methods set forth above.

Advantages of the present invention include, but not limited to, facilitating a user-friendly channel surfing experience in an adaptive streaming environment that is similar to what is commonly encountered in existing TV broadcast environments. As one or more embodiments set forth herein allow rapid changing of adaptive streaming channels without bandwidth waste, unsatisfactory viewing conditions that can result from changing streaming channels are mitigated. Further features of the various embodiments are as claimed in the dependent claims. Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

Figure 1:
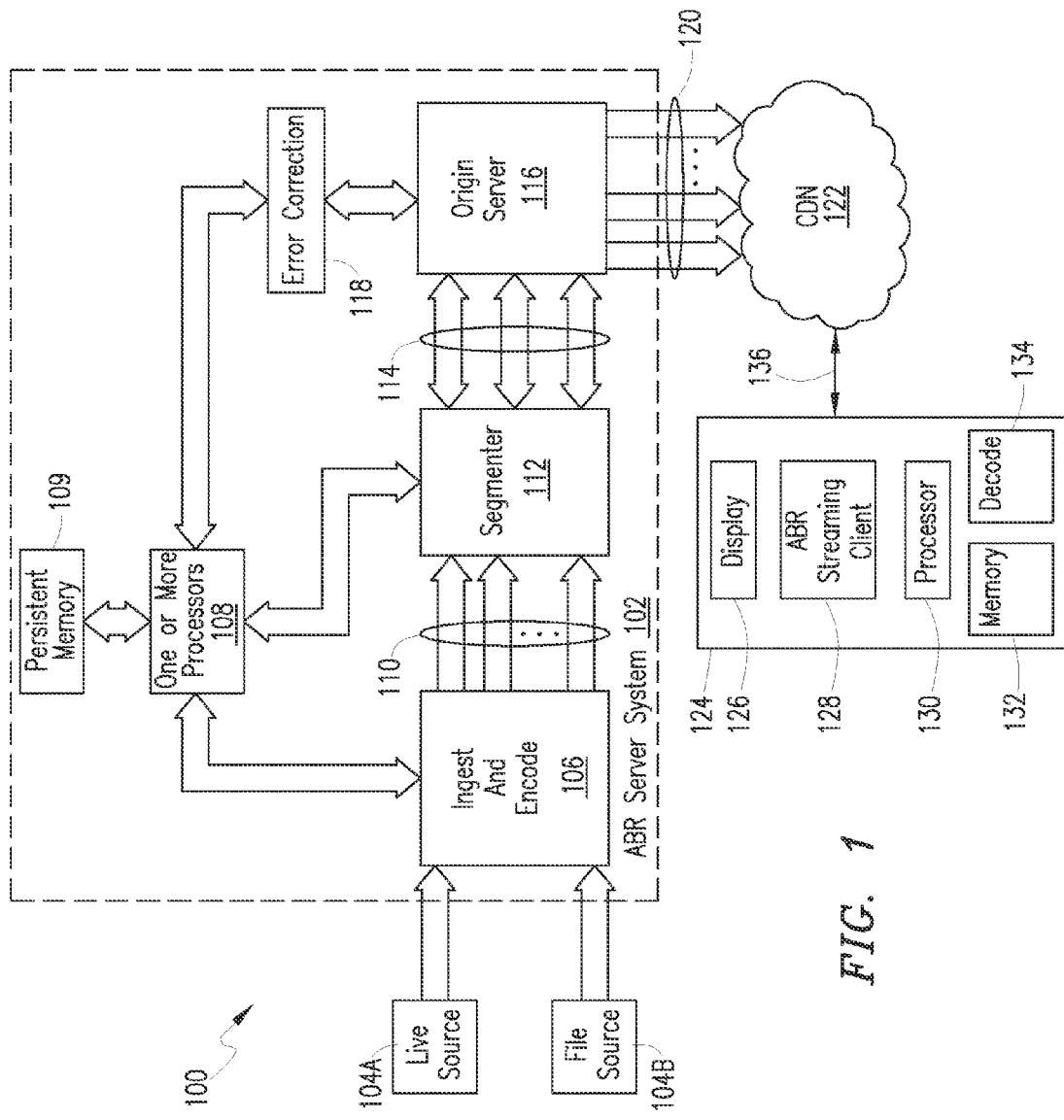
FIG. 1 depicts an example streaming network environment including a content delivery network wherein one or more embodiments of the present patent application may be practiced.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components-based details. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element or node may be comprised of one or more pieces of service network equipment, including hardware and software that communicatively interconnects other equipment on a network (e.g., other network elements, end stations, etc.), and is adapted to host one or more applications or services with respect to a plurality of subscribers. Some network elements may comprise "multiple services network elements" that provide support for multiple network-based functions (e.g., A/V media management, session control, QoS policy enforcement, bandwidth scheduling management, subscriber/device policy and profile management, content provider priority policy management, streaming policy management, and the like), in addition to providing support for multiple application services (e.g., data and multimedia applications). Subscriber end stations or client devices may comprise any device configured to execute, inter alia, at least one streaming client application (e.g., an ABR streaming client application) for receiving content from a streaming server or content provider. Accordingly, such client devices may include set-top boxes, PVR/DVRs, workstations, laptops, netbooks, palm tops, mobile phones, smartphones, multimedia phones, Voice Over Internet Protocol (VOIP) phones, mobile/wireless user equipment, high definition TV terminals, portable media players, location-aware subscriber equipment, gaming systems or consoles (such as the Wii®, Play Station 3®, Xbox 360®), etc., that may access or consume content/services provided over a content delivery network in accordance with one or more embodiments set forth herein. Further, the client devices may also access or consume content/services provided over broadcast networks (e.g., cable and satellite networks) as well as a packet-switched wide area public network such as the Internet via suitable service provider access networks. In a still further variation, the client devices or subscriber end stations may also access or consume content/services provided on virtual private networks (VPNs) overlaid on (e.g., tunneled through) the Internet.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1, depicted therein is an example streaming network environment 100 including a content delivery network or content distribution network (CDN) 122 coupled to an adaptive streaming server system 102 wherein one or more embodiments of the present patent application may be practiced. For purposes of the present patent application, CDN 122 may comprise an overlay network architected for high-performance streaming of a variety of digital assets or program assets as well as services (hereinafter referred to as "media content") to subscribers using one or more Internet-based infrastructures, private/dedicated infrastructures or a combination thereof. In general, the terms "media content" or "content file" (or, simply "content") as used in reference to at least some embodiments of the present patent disclosure may include digital assets and program assets such as any type of audio/video content or program segment, streaming or static (e.g., recorded over-the-air free network television (TV) shows or programs, pay TV broadcast programs via cable networks or satellite networks, free-to-air satellite TV shows, IPTV programs, etc.), Over-The-Top (OTT) and video-on-demand (VOD) or movie-on-demand (MOD) shows or programs, time-shifted TV (TSTV) content, as well as other content assets provided by content publishers, owners or providers, including but not limited to software files, executable computer code or programs, online electronic games, Internet radio shows/programs, entertainment programs, educational programs, movies, music video programs, and the like, that may be delivered using any known or heretofore unknown streaming technologies. Further, various programs or content files provided via streaming may be arranged as a collection or assembly of channels that are specific to different subscribers, wherein different channels may comprise media content from one or more content sources or originators.

By way of illustration, content may be delivered via CDN 122 using adaptive bit rate (ABR) streaming techniques and may be encoded to support Microsoft® Silverlight® Smooth Streaming, HTTP streaming (for instance, Dynamic Adaptive Streaming over HTTP or DASH, HTTP Live Streaming or HLS, HTTP Dynamic Streaming or HDS, etc.), Icecast, and so on. In general, the overlay architecture of CDN 122 may include a multi-level, hierarchically-organized interconnected assembly of network servers for providing media pathways or "pipes" from one or more central distribution nodes to one or more levels of regional distribution nodes that are connected to one or more local edge servers configured to serve a plurality of end users or subscribers in respective serving location areas. In addition to such "distribution servers" (sometimes also referred to as "surrogates"), CDN 122 may also include and/or interoperate with various network elements configured to effectuate request redirection or rerouting mechanisms as well as related back office systems such as subscriber management systems, bandwidth scheduling systems, account/billing systems and the like, that may be deployed as part of a streaming network back office (not specifically shown).

The streaming network environment 100 includes one or more subscriber end stations, as illustrated by an example client device or user equipment (UE) device 124 associated with a subscriber/customer for consuming content delivered via CDN 122 in any type or number of access technologies including broadband access via wired and/or wireless (radio) communications. For purposes of the present patent application, the terms "streaming client device" and "client device" may be used synonymously and may comprise any UE device or appliance that in one implementation not only receives program assets for live viewing, playback and/or decoding the content, but also operates as a command console or terminal that can accept user inputs, commands or requests to interact with a network element disposed in CDN 122 and/or the associated streaming server systems 102 for requesting content that may be selectively rendered at an internal display screen 126 and/or one or more external audio/visual (A/V) devices (not specifically shown). As such, the example client device 124 may include one or more streaming client modules 128 (e.g., an ABR streaming client) and associated decoding functionalities 134 depending on the streaming technologies implemented, each operating in association with a processor module 130 and video buffer memory 132 for effectuating acquisition, decoding and rendering of the streamed media content. Although not specifically shown, the client device 124 also includes appropriate user interfaces for viewing one or more electronic program guides that list, identify or otherwise show the various streaming channels the subscriber is able to receive. Such user interfaces may also be configured to allow the user to scroll through an electronic program guide (i.e., channel surfing), select or otherwise change a particular streaming channel, and the like. Further, as will be described in additional detail hereinbelow, the client device 124 includes appropriate structures and modules for facilitating such functionalities as channel surfing and channel selection within an adaptive streaming network environment.

Continuing to refer to FIG. 1, the example adaptive streaming server system 102 may be configured to accept media content from live sources 104A and/or static file sources 104B. In general operation, the example streaming server system 102 may be configured, under the control of one or more processors 108 executing appropriate program code stored in a persistent memory module 109, to effectuate adaptive streaming of content as follows. Initially, source media content is transcoded or otherwise encoded with different bit rates (e.g., multi-rate transcoding) using applicable encoder(s) 106. For example, a particular program content may be transcoded into five video files using variable bit rates, ranging from low to high bit rates (500 Kbps to 10 Mbps, by way of illustration). The particular content is therefore encoded as five different "versions" or "formats", wherein each bit rate is called a profile or representation. Reference numeral 110 refers to a collection of media streams encoded at different bit rates by the encoder 106. A segmentation server or segmenter 112 is operative to divide each version of the encoded media content into fixed duration segments or chunks, which are typically between two and ten seconds in duration, thereby generating a plurality of chunk streams 114. One skilled in the art will recognize that shorter segments may reduce coding efficiency whereas larger segments may impact the adaptability to changes in network throughput and/or fast changing client behavior. Regardless of the chunk size, the segments may be Group-of-Pictures (GOP)-aligned such that all encoding profiles have the same segments. One or more suitable Manifest Files are then created that describes the encoding rates and Universal Resource Locator (URL) pointers the various segments of encoded content. In one implementation, the Manifest File (MF), a Delivery Format (DF) and means for conversion from/to existing File Formats (FF) and Transport Streams (TS) may be provided by an origin server 116 as part of adaptive streams 120 to the client device 124 over CDN 122, which uses HTTP to fetch the encoded segments based on the URLs. Additionally, an error correction mechanism 118 may also be implemented, either as part of the streaming server system 102 or as a separate network element, in order to reduce transmission errors in the end-to-end streaming of the encoded media content. It should be apparent that the error correction mechanism 118 may be protocol-specific (e.g., Transmission Control Protocol or TCP), although other error correction schemes may also be used additionally or alternatively.

Still continuing to refer to FIG. 1, the media stream segments received by the client device 124 may be buffered, as needed, and decoded and played back (i.e., rendered) in sequence, either at the local display 126 or at an external A/V device associated with the client device 124. The ABR streaming client module 128 may be designed to select an optimum profile of each segment so as to maximize quality without risking buffer underflow and stalling (i.e., rebuffering) of the play-out. Each time the client device 124 fetches a segment, it may choose the profile based on the measured time to download the previous one or several segments.

It will be recognized that changing media content (i.e., from one streaming channel to another streaming channel) in an adaptive streaming environment such as the example network arrangement 100 shown in FIG. 1 can be a cumbersome process, especially in fast channel changing conditions. That is because adaptive streaming typically requires that appropriate video buffers be filled to certain levels before rendering, in addition to content segments encoded in high bit rates (i.e., "high bit rate content") being preferred to the same content segments encoded in low bit rates (i.e., "low bit rate content"), etc. Further, as several processing events or stages need to take place in a sequential order before the received media content can be properly rendered (i.e., played back), changing channels can yield an unacceptable viewing experience (e.g., stuttering, jitter, pixelation, etc.) because of the delays and/or interruptions introduced in the overall receive-decode-rendering process. Several embodiments will be set forth in detail hereinbelow, which relate to server-side processes and structures, client-side processes and structures, or both, that address the foregoing issues.

Figure 2:
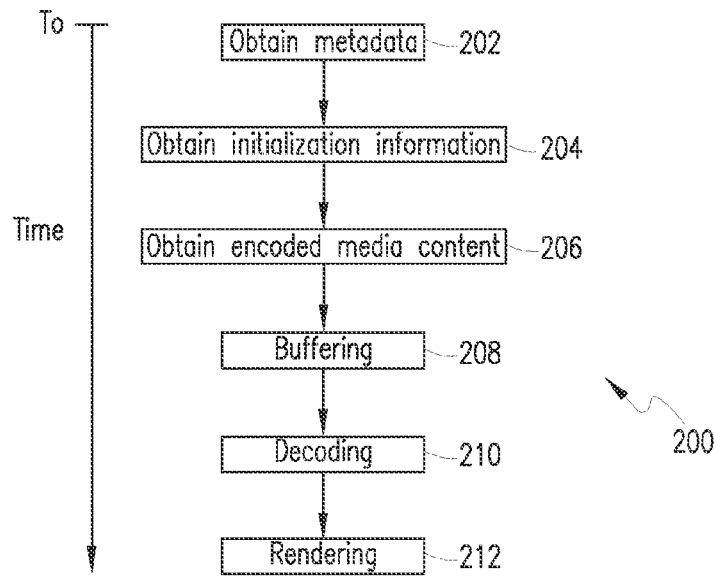
FIG. 2 depicts a diagram of example stages involved in an illustrative acquisition and rendering process for streaming video content for purposes of the present patent disclosure.

FIG. 2 depicts a diagram of example stages involved in an illustrative streaming media acquisition and rendering process 200 according to an embodiment of the present patent disclosure. As described above, a client device first obtains, receives or otherwise acquires certain metadata, e.g., manifest files, with respect to media transport streams (block 202). Based on the information contained in the manifest files, various pieces of initialization information are obtained or otherwise acquired (block 204). Such initialization information may comprise, inter alia, Sequence Parameters Set (SPS), Picture Parameters Set (PPS), one or more codec headers such as, e.g., MPEG-2 sequence headers, or High Efficiency Video Coding (HEVC) headers, or AC3 (audio) headers, and any data necessary to decode at least one or more frames, or depending on the granularity of prediction, one or more slices (which are spatially distinct regions of a frame that are encoded separately from other regions of that frame), and/or any combination thereof. Such encoded frames may comprise I-frames (Intra-coded pictures), B-frames (Bi-predictive pictures), or P-frames (Predictive pictures). Likewise, slices may comprise I-slices, B-slices or P-slices. Using the initialization information, encoded media content or data is then obtained or retrieved (block 206) and buffered (208). As appropriate levels of buffer data become available, such data is decoded (210) and then provided to a display screen for rendering (212), using suitable decoder/rendering engines.

In accordance with the teachings of the present patent disclosure, at least one or more stages of the process flow 200 set forth above may be performed in an anticipatory manner such that those process stages may be "pre-performed". Accordingly, certain basic information necessary to decode streaming media content is made readily available to an adaptive streaming client by virtue of pre-performing some of the early process stages. As a consequence, the adaptive streaming client can promptly utilize the already available information (i.e., "pre-fetched" information) to quickly adjust to a new channel when a user decides to scroll through the channels and/or select a particular channel thereafter. In further accordance with the teachings of the present patent disclosure, anticipatory pre-performance of certain process stages as set forth in the foregoing may be implemented for a select number of streaming channels that are determined to be "adjacent" with respect to a current streaming channel based on predictive channel surfing behavior, channel categorization, adaptive learning, pattern recognition, and other criteria.

Figures 3A, 3B, 3C:
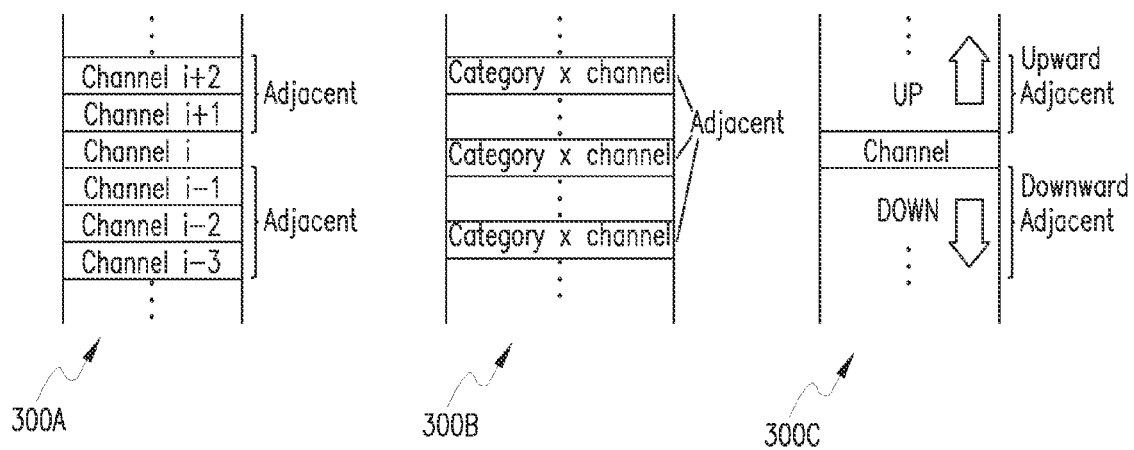
FIGS. 3A-3C depict examples of various types of channel adjacencies according to one or more embodiments of the present patent disclosure.

FIGS. 3A-3C depict examples of various types of channel adjacencies according to one or more embodiments of the present patent disclosure. In example 300A shown in FIG. 3A, one or more adjacent channels may be determined as a configurable number of consecutive channels that are above the current streaming channel (i) (e.g., (i+2) channels), or as a configurable number of consecutive channels that are below the current streaming channel (i) (e.g., (i−3) channels), or both. In another embodiment, example 300B shown in FIG. 3B illustrates a scenario where channels may be grouped based on content categorization. Such categories may be defined as user-based "favorites lists", for example. Accordingly, all channels belonging to category "x" may be deemed to be adjacent with respect to one another. FIG. 3C illustrates a scenario where a user's surfing behavior pattern (e.g., over a period of time) may be used to identify whether the user is likely to surf in one direction or the other direction and then selecting adjacent channels in the direction.

Those skilled in the art should appreciate that the foregoing examples of channel adjacencies merely represent a non-exhaustive list, as there can be numerous variations, methodologies, determinations and schemes by which adjacency may be implemented. Channel adjacencies may also be dynamically changed from default settings and may be configured to vary from one scheme to another based on users' viewing habits, etc. It should also be recognized that certain channel adjacency implementations may depend on how electronic program guides are organized and presented to the users. Accordingly, for purposes of at least some embodiments of the present patent disclosure, an adjacent channel is a streaming channel for which certain process stages shown in FIG. 2 are preemptively performed. Moreover, the number of adjacent channels for which metadata is pre-fetched may be dependent on certain performance/resource constraints pertaining to the client device itself, e.g., current bandwidth conditions, the number of available decoders, buffer conditions, decode processing conditions, and the like.

Figure 3D:
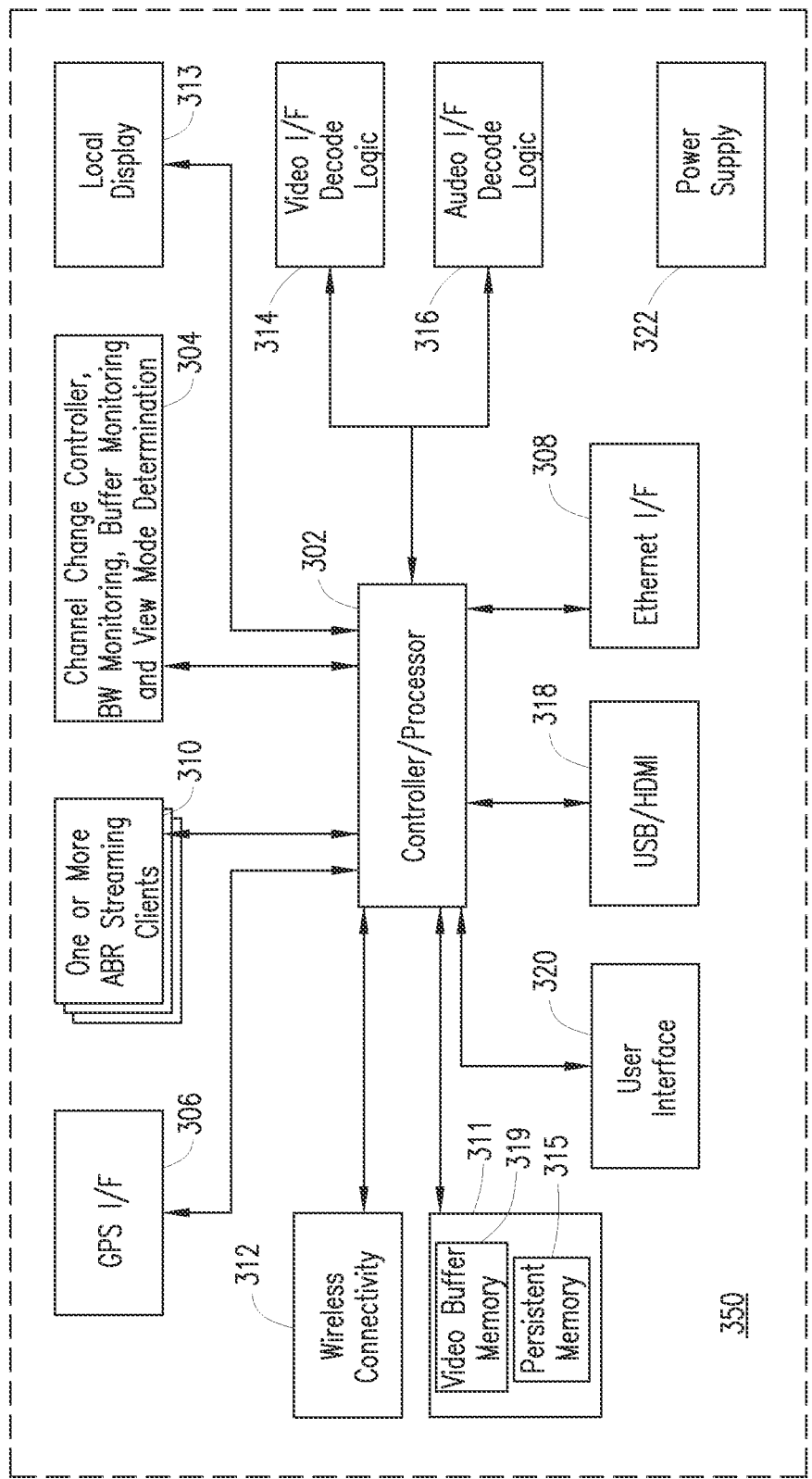
FIG. 3D depicts a block diagram of an example streaming client device according to one embodiment.

Referring now to FIG. 3D, depicted therein is a block diagram of an example streaming client device 350 according to one embodiment wherein one or more aspects of the present patent disclosure may be practiced. It should be appreciated that the streaming client device 350 is a UE device that is generally representative of the subscriber/client device 124 illustrated in FIG. 1, and may include appropriate hardware/software components and subsystems that may augment or otherwise rearrange the blocks shown as part of the client device 124. Broadly, such hardware/software components and subsystems may be configured for performing any of the device-side processes (either individually or in any combination thereof) described hereinabove, which may be rearranged when taken in view of one or more processes described below. A processor module 302 including one or more microcontrollers/processors is provided for the overall control of the client UE device 350 and for the execution of various stored program instructions embodied in a persistent memory 315 that may be part of a memory subsystem 311 of the device 350. Also, one or more video buffers 319 may be included in the memory subsystem 311 for storing video streaming data. Controller/processor complex referred to by reference numeral 302 may also be representative of other specialty processing modules such as graphic processors, video processors, digital signal processors (DSPs), and the like, operating in association with suitable video and audio interfaces 314, 316 for receiving/transmitting content data, which interfaces may include or operate in conjunction with appropriate tuners, demodulators, descramblers, MPEG decoders/demuxes. For example, the client device 350 may be configured to operate with a number of known audio formats (e.g., MP3, AAC, AAC+, eAAC+, FLAG WMA, WAV, AMR, OGG, DTS, AC3, LPCM and MIDI) as well as video formats such as, e.g., MPEG4, H.263, H.264, DivX, XviD, WMV, AVI, 3G0, Flash Video, etc. A location-based and/or satellite communications interface 306 may be provided in certain embodiments for effectuating satellite-based communications. Other I/O or interfaces may include one or more user interfaces 320 generally illustrative of a graphic user interface (GUI), touch-sensitive screen, keyboard, microphone, etc., that may be used for inputting commands to effectuate, inter alia, channel surfing, channel selection, program guide manipulation, and the like. Additionally, one or more USB/HDMI/DVI/FireWire ports 318 may be provided for effectuating connections to one or more external A/V devices whereby the decoded media content may be rendered externally. Broadband network connectivity may be achieved via interfaces such as Ethernet I/F 308 as well as short-range and wide area wireless connectivity interfaces 312. In one implementation of the client device 350, a hard disk drive (HDD) system (not specifically shown) may be provided for mass storage of program assets such as A/V media, TV shows, movie titles, multimedia games, etc. Also included in the client/UE device 350 is a suitable power supply 322, which may include AC/DC power conversion to provide power for the device 350. It should be appreciated that the actual power architecture for the client/UE device 350 may vary by the hardware platform used, e.g., depending upon the core SoC (System on Chip), memory, analog front-end, analog signal chain components and interfaces used in the specific platform, and the like.

For purposes of the present patent application, the stored program instructions embodied in the persistent memory 315 (e.g., Flash memory) of the client device 350 may include computer-readable instructions configured to perform one or more device-side processes, selectively in conjunction with other subsystems or logic blocks such as one or more ABR streaming client and decode logic modules 310 and other subsystems such as a channel change controller, bandwidth and other performance monitors, as well as view mode and channel adjacency determination mechanisms, all collectively referred to by reference numeral 304. Further, an optional local or included display 313 may also be provided as part the client device 350 for rendering received content locally (for example, in a number of resolutions such as Standard Definition, Enhanced Definition or High Definition) in addition to operating as a touch-sensitive screen.

In one aspect of the present patent disclosure, the various modules, blocks and subsystems set forth above may be configured to effectuate efficient display of adjacent channels through pre-fetched metadata in an adaptive streaming environment. In general, the client device 350 may be configured to operate in two functional modes: (i) a "viewing" mode in which certain data may be pre-fetched in addition to delivering high quality video; and (ii) a "channel changing" or "channel surfing" mode in which fetching low quality or "good enough" quality video to display rapidly changing channels is the main concern. The client device 350 may be in "viewing" mode if no channel is changed after or within a configurable period of time (e.g., 30 seconds). On the other hand, the client device 350 may be in "channel changing" mode if the channel has recently been changed (e.g., less than 30 seconds).

Figure 4:
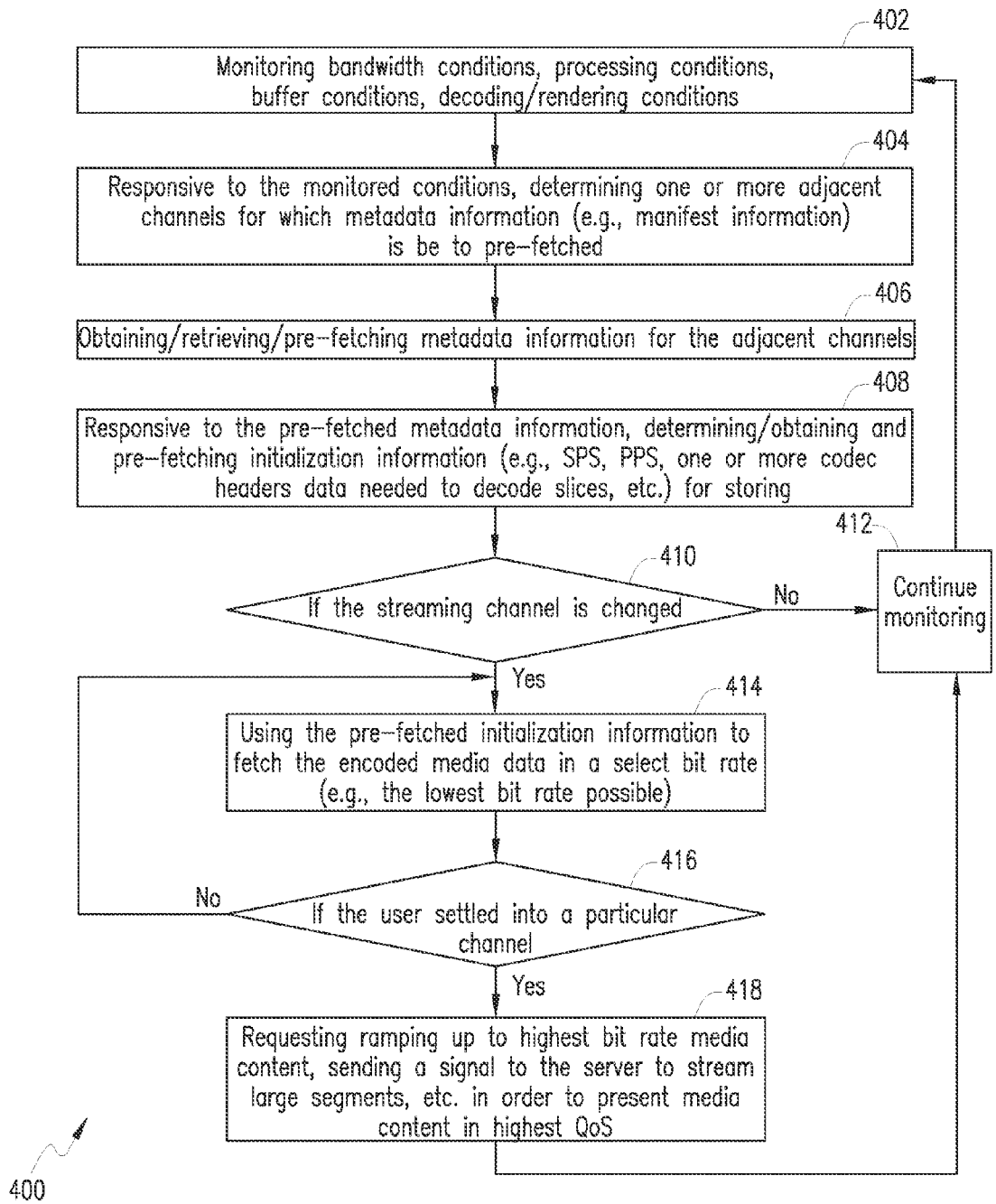
FIGS. 4-6 depict flowcharts with blocks relative to various steps and acts that may take place at a client device according to one or more embodiments of the present patent application.

At least a portion of the modules, blocks and subsystems of the client device 350 are operable to effectuate one or more of the following processes and sub-processes under the control of processor 302 for purposes of facilitating efficient display of adjacent streaming channels according to one or more embodiments of the present patent application. Referring to an embodiment of process 400 shown in FIG. 4, the client device 350 may be configured to monitor current bandwidth conditions (e.g., relative to the network connection such as connection 136 shown in FIG. 1 as well as any other distributions pipes involved in the end-to-end distribution path through the CDN) and other performance conditions, as set forth at block 402. Responsive to the monitored conditions, a determination may be made as to how many adjacent channels for which certain metadata information is to be pre-fetched. In an illustrative example, if 2 Mb of bandwidth is currently available (after accounting for whatever bandwidth is being utilized for the current streaming session), assuming that each channel requires 400 Kb of bandwidth to fetch its metadata, a determination could be made that the client device is capable of fetching metadata for five adjacent channels. As described previously, various constructs of channel adjacencies may be implemented, including, e.g., user-specific or user-defined lists, operator-defined lists, based on program guide implementations, content categories, language-based definitions, static or fixed configurations, etc. In a predictive behavior modeling approach, if the user has pressed up three channels (i.e., scrolled up three times) within a specified period of time, a probabilistic determination can be made that the user is likely to scroll up again rather than down, for example. Accordingly, a certain number of channels above the current channel may be deemed to be the adjacent channels for which metadata will be pre-fetched. The foregoing operations are illustrative of the acts and functions set forth at block 404 of the process flow 400.

After determining one or more adjacent channels (e.g., relative to a current streaming channel), metadata information for the adjacent channels is obtained, requested, retrieved, or otherwise pre-fetched from the associated server system(s) (block 406). In one adaptive streaming implementation, such metadata may comprise appropriate manifest files relative to the encoded media content streaming on the adjacent channels. The streaming client logic executing on the client device 350 is operable to parse the pre-fetched metadata information, and responsive thereto, determine where to go to obtain initialization information for the adjacent channels (block 408). As previously described, such initialization information may comprise at least one of SPS/PPS information, one or more codec headers, and the minimum amount of metadata necessary to decode slices/frames. Accordingly, based on the pre-fetched metadata information, the client device 350 is further operable to pre-fetch or pre-download the adjacent channels' initialization information, which may be locally stored in memory (block 408). If the current streaming channel is changed to a new streaming channel belonging to the group of adjacent channels (decision block 410), the initialization information for the new streaming channel (which is readily/locally available because it was pre-fetched) is used by the client device 350 to quickly fetch the required media content from appropriate locations (block 414). In one implementation, the streaming client logic executing on the client device 350 may be configured to request for only the media content that is encoded at a select bit rate, e.g., the lowest bit rate, by the streaming server's encoder. Additionally or alternatively, the client device 350 may also request for the encoded media content that is segmented into shorter segments.

If there is no channel changing, the client device 350 may continue to monitor the bandwidth conditions, buffer resources, and processing conditions so that new or modified channel adjacencies may continue to be (re)established or otherwise (re)determined (blocks 412, 402, 404). If the user settles into a particular channel (i.e., "viewing" mode) as set forth at decision block 416, the streaming client logic executing on the client device 350 may be configured to request for the media content that is encoded at higher bit rates, potentially going all way to the highest bit rate profiles possible (i.e., ramping up). Additionally or alternatively, the client device 350 may also request for the encoded media content that is segmented into larger segments. Accordingly, it should be appreciated that once the client device 350 is in "viewing" mode, media content with highest QoS may be presented to the user relatively quickly. These operations are illustratively set forth at block 418. Thereafter, the client device 350 may (re)establish or otherwise (re)determine newer channel adjacencies based on the monitored conditions as described previously.

One skilled in the art will recognize upon reference hereto that by executing the above-described pre-fetching operations, at least process stages 202 and 204 illustrated in FIG. 2 may be advantageously circumvented at the time of channel changing, thereby gaining a "head start" when the channel is changed. As the media content for the new channel is more readily available, albeit at low bit rate profiles and/or shorter segments (at least initially), the decoder/renderer engine of the client device can quickly process the media content so that at least some of the image rendering issues that can arise in a typical channel-changing streaming environment may be alleviated.

Figure 5:
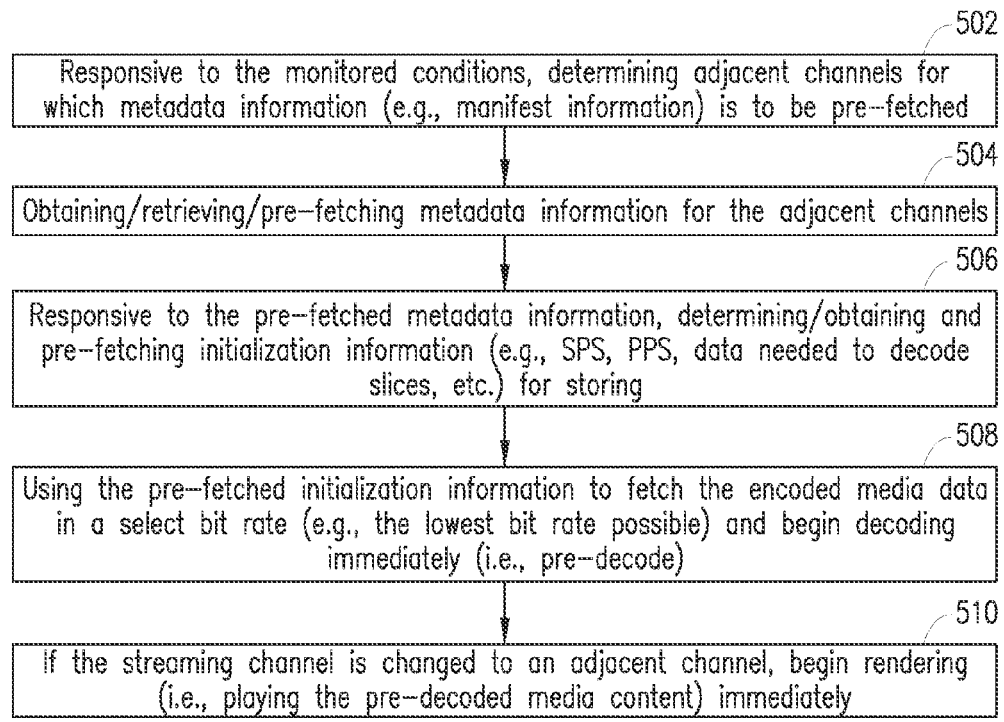

Referring now to FIG. 5, shown therein is another embodiment of a process flow 500 that may be implemented by a streaming client device (e.g., client device 350) having multiple streaming client applications and corresponding decoders for achieving additional efficiencies in a channel changing environment. Similar to the process flow 400 described above, the process flow 500 includes blocks 502-506 where the client device 350 may continue to monitor the bandwidth conditions, buffer resources, processing conditions, etc., so that appropriate channel adjacencies may be determined and metadata and initialization data may be pre-fetched. Using the pre-fetched initialization information, the client device 350 proceeds to fetch the adjacent channels' media content and begins to decode immediately (block 508). In other words, the client device 350 is operative to decode multiple streams from the adjacent channels in parallel (by virtue of separate streaming clients/decoders)

(i.e., pre-decoding), thereby gaining an additional head start with respect to the process stage of 210 shown in FIG. 2. It should be realized that early parts of media segments may comprise a "moof" atom (e.g., in Fragmented MP4 coding) that informs where all the video samples in the segments are and an IDR (Instantaneous Decoding Refresh) slice of the frames. At this point, the rendering engine of the client device 350 has enough information to put some pixels on the display screen. Accordingly, if the current streaming channel is changed to one of the adjacent channels, the rendering engine of the client device 510 can begin rendering immediately (because the pre-decoded media content is already available in appropriate video buffers) as set forth at block 510. Thereafter, the client device 350 may (re)establish or otherwise (re)determine newer channel adjacencies based on the monitored conditions as described previously with respect to FIG. 4.

Figure 6:
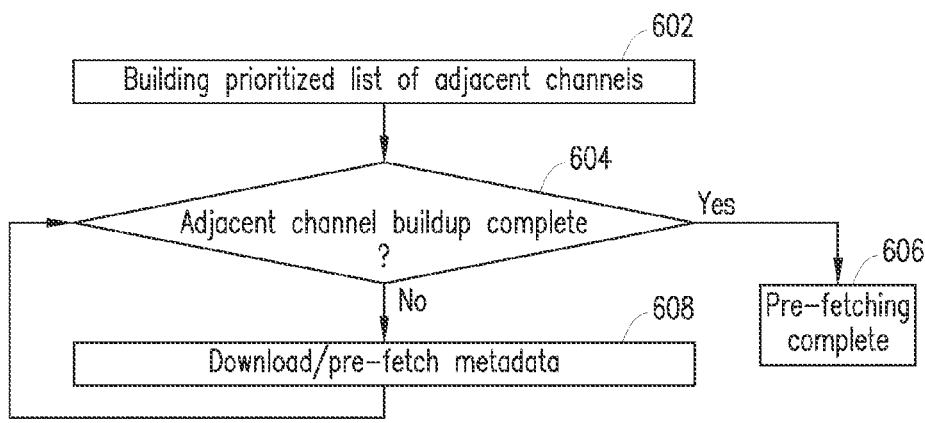

FIG. 6 depicts a flowchart of a high-level channel buildup process 600 that may be executed by the example client device 350 at least relative to certain aspects of the present patent disclosure. At block 602, one or more lists of adjacent channels may be built, which in some embodiments may be prioritized based on user preferences, content provider policies, etc. As discussed above, various pieces of data (up to and including encoded media segments, in certain implementations) may be pre-fetched for each adjacent channel. At decision block 604, a determination may be made as to whether adjacent channel buildup is complete, i.e., if all the necessary pre-fetching operations for the channels determined to be adjacent have been concluded. If so, the process flow stops (block 606). Otherwise, pre-fetching/downloading operations may continue to be performed relative to the remaining adjacent channels (block 608).

Figure 7:
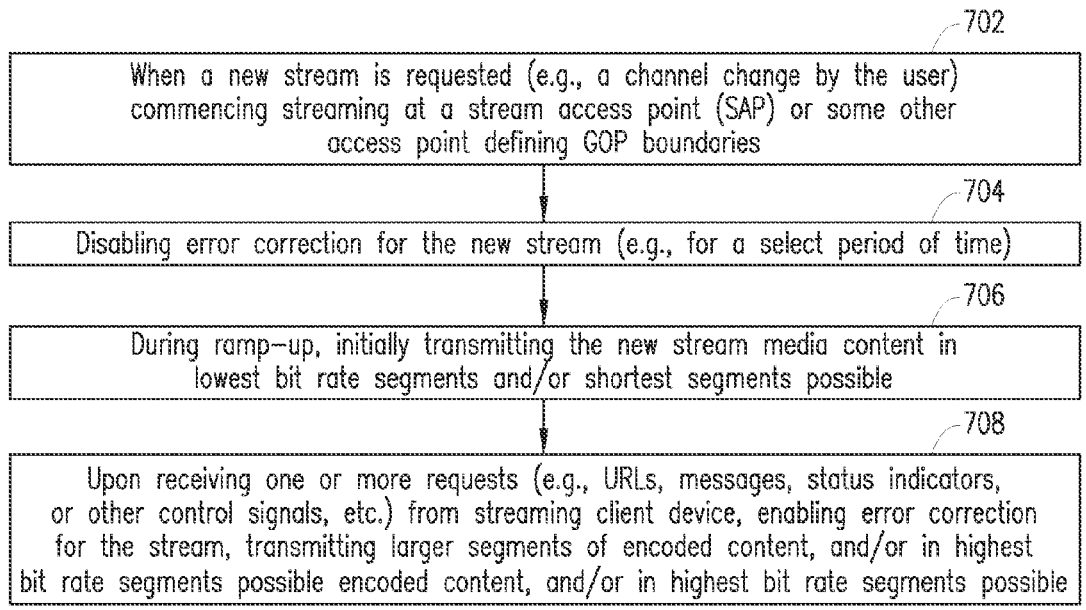
FIG. 7 depicts a flowchart with blocks relative to various steps and acts that may take place at an adaptive streaming server system according to one or more embodiments of the present patent application.

Turning now to FIG. 7, depicted therein is a flowchart with blocks relative to various steps and acts that may take place at an adaptive streaming server system (e.g., server system 102 shown in FIG. 1) according to one or more embodiments of the present patent application with respect to facilitating fast channel changes in an adaptive streaming environment. In particular, process flow 700 of FIG. 7 illustrates various functionalities that may be effectuated—independently or in some combination or sub-combination thereof—by the processor complex 108 upon executing appropriate service logic stored in the persistent memory 109 and operating in conjunction with other subsystems (e.g., encoder 106, segmenter 112, error correction 118, etc.) of the server system 102. When a new stream of media content is started at the server system 102 (e.g., because of a user's channel change request), the service logic embodied in the persistent memory 109 may be configured to always commence streaming of the requested media content at a specific point (block 702) such as a Stream Access Point (SAP), which is a GOP random access point in the content stream guaranteed that all frames in the GOP are decodable. Additionally or alternatively, the service logic of the server system 102 may be configured to disable error correction mechanisms 118 for the transmission of the new stream to the client device 350 for a select period of time (block 704). It will be recognized that disabling a protocol-specific error correction mechanism may yield a non-standard protocol transmission of streaming data, but one without the error correction overhead, thereby facilitating a faster transmission rate to the client device 350. It should further be apparent that the timing windows during which an error correction mechanism is relaxed may be configurable or otherwise customizable, e.g., responsive to requests, commands, signals, etc. from the network and/or client device 350. In an additional or alternative variation, the service logic of the server system 102 may be configured to facilitate, at least initially, only transmission of the media content encoded at a select bit rate (e.g., lowest bit rate possible) and/or segmented into shortest segments by the segmenter 112, as set forth at block 706. Again, the initial period during which the streaming server's functionalities are conditionally modulated (e.g., a ramping up period) may be configurable responsive to requests from the client device 350 and/or other control signals from network management nodes. For instance, in one implementation, the error correction relaxation period and initial ramp up period may be provided to be the same. In another implementation, the two time periods may be different. In a still further implementation, responsive to receiving one or more requests from the client device 350 (e.g., messages, alarms, status indicators, etc.), the error correction mechanism may be enabled or re-enabled regardless of the entity or event that initially disabled the error correction mechanism when the new media stream was started. Additionally or alternatively, one or more requests from the client device 350 (e.g., URLs, pointers, indicators, etc.) may selectively instruct the server system 102 to begin transmitting the media content encoded at higher bit rates and/or in larger segments. By way of illustration, the client device 350 may send one URL (operative as a first URL, for example) http://www.purplefrog-.com/vid/665/r1/0000311.m4s for low bit rate media content and another URL (operative as a second URL, for example) http://www.purplefrog.com/vid/665/r2/0000311.m4s for high bit rate media content. It should be realized that such requests may be generated by the client device in response to various conditions, inter alia, bandwidth conditions, quality of the rendered video, buffer conditions, decode processing conditions, and the like. Accordingly, the streaming functionality effectuated by the server system 102 may be conditionally modulated responsive to the various requests as set forth at block 708.

Figure 8:
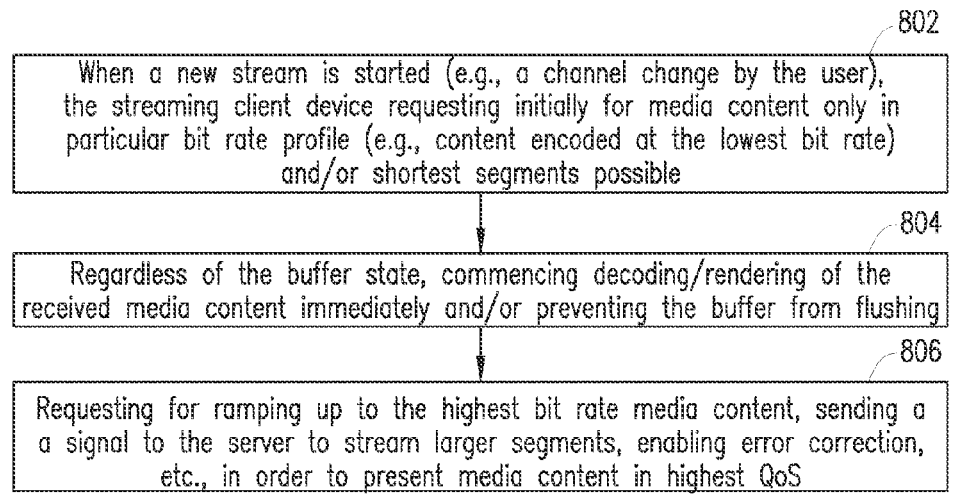
FIGS. 8-10 depicts flowcharts with blocks relative to various steps and acts that may take place at a client device according to one or more embodiments of the present patent application.

To facilitate fast channel changes in concert with the foregoing functionalities of the streaming server system 102, the client device 350 may also be configured accordingly to effectuate a number of processes—independently or in some combination or sub-combination thereof. FIG. 8 depicts a process flow 800 with blocks relative to various steps and acts that may take place at the client device 350. When a media content stream is newly started (e.g., due to a channel change request), the client device 350 is operative to initiate a request for only media content that is encoded in the lowest bit rate possible and/or in shortest segments (block 802). As the encoded media content is being received, the client device 350 may be configured to commence immediate decoding and rendering of the received media content, regardless of the buffer state. As described previously with respect to the embodiment of FIG. 5, such immediate decoding/rendering is possible upon receiving at least a minimum amount of information. Additionally or alternatively, the video buffer memory 319 may be prevented from being flushed during a ramp up period. The foregoing functionalities, illustratively set forth at block 804, may be effectuated by the channel change controller and buffer monitor 304, preferably operating in concert with the appropriate streaming client 310 under the control of the processor complex 302. Depending on the bandwidth conditions, video quality, etc., the client device 350 may gradually ramp up the requested bit rates and/or segment sizes (potentially requesting media content encoded at the highest bit rates possible and segmented into largest segments) by generating appropriate signals to the streaming server system 102. The client device 350 is also operative to send a signal or request to enable or re-enable error correction at the streaming server system 102 if the error correction was disabled initially. After the client device 350 has achieved a bit rate suitable for acceptable quality video (e.g., high quality), the client device 350 behaves normally in "viewing" mode until a new media content stream is requested. The foregoing functionalities are illustratively set forth at block 806. It should be appreciated that the various requests/signals described above may be generated by the client device 350 at different times (i.e., asynchronous with respect to one another), and after expiration of select/customizable time periods from the time when the new stream is started.

Figure 9:
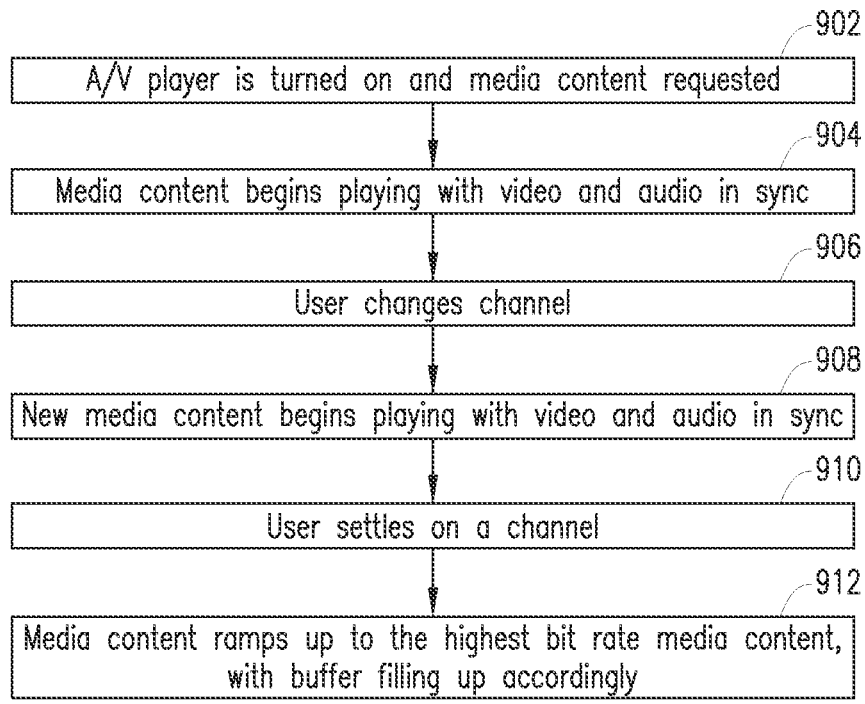

FIG. 9 depicts an example user viewing experience 900 that may be achieved by implementing an embodiment of the streaming server system 102 and client device 350 as set forth above. At block 902, the client device 350 (e.g., a streaming A/V player) is turned on and a select channel media content is requested. At block 904, the requested media content begins playing with video and audio in sync, although the rendered content may be at a low quality. At block 906, the user changes the channel, whereupon the new media content is played with video and audio in sync (block 908). Again, the overall quality of the new media content may be low, as there may be audio and/or visual glitches in the rendering. When the user settles on a channel, the media content of that channel gradually ramps up to the highest bit rate possible (potentially within in a few seconds), with the video buffer filling up accordingly (block 912).

Figure 10:
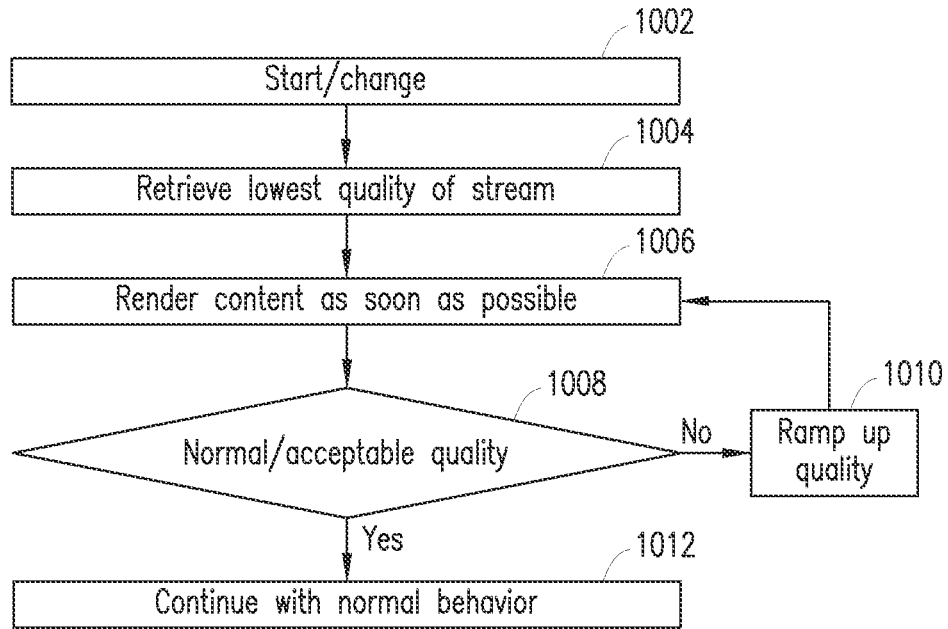

FIG. 10 depicts a flowchart of a high-level channel changing process 1000 that may be executed by the example client device 350 at least relative to certain aspects of the present patent disclosure. At block 1002, a channel change is started, whereupon the client device 350 initially receives a lowest quality stream (1004). The received low quality stream is decoded and rendered as immediately as possible (block 1006). The bit rates, segment sizes and quality in general are ramped up until normal/acceptable quality is achieved, as set forth at blocks 1008, 1010. Thereafter, the client device 350 behaves normally in "viewing" mode until a new media content stream is requested, as described above.

Figure 11:
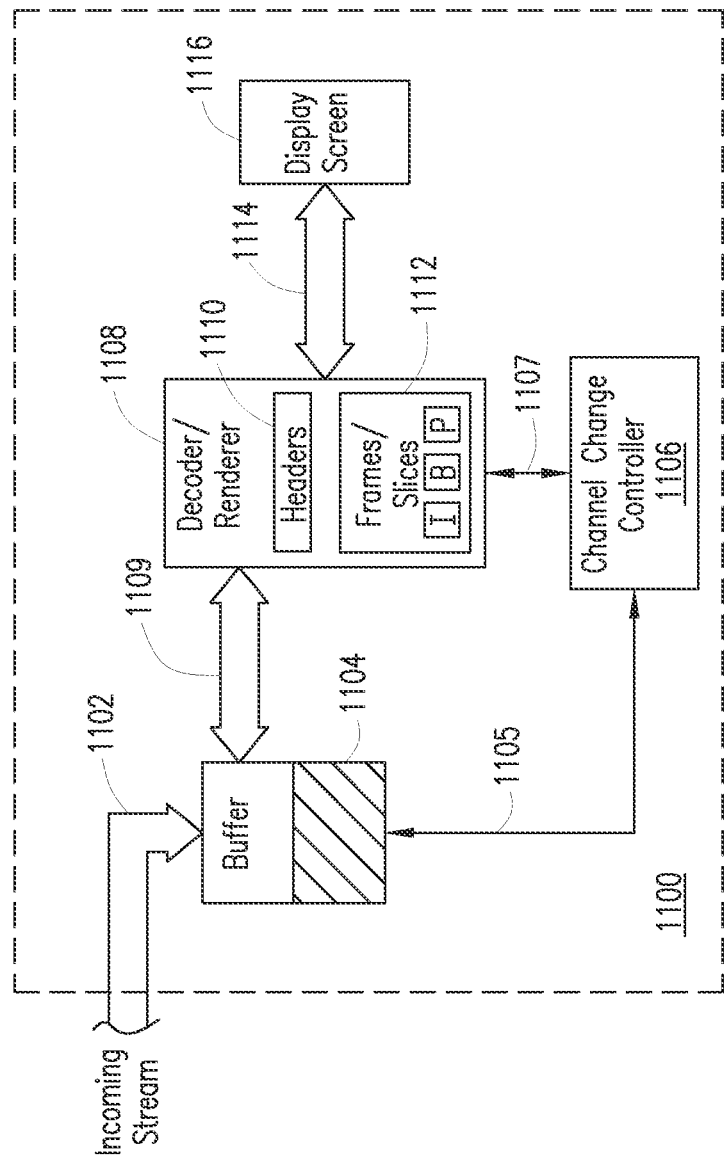
FIG. 11 depicts another embodiment of an example streaming client device for purposes of the present patent application.

FIG. 11 depicts another embodiment of an example streaming client device 1100, which is representative of a portion of the client device 350, for purposes of the present patent application. A channel change controller 1106 is provided with communication paths 1105, 1107 to intercept, interrupt, or otherwise control the operations relative to a video buffer 1104 that is operative to store an incoming video stream and a decoder/renderer 1108, respectively. The decoder/renderer 1108 is coupled to the video buffer 1104 via a communication path 1109 and to a display screen 116 via a communication path 1114. In normal viewing operations, the decoder/renderer 1108 is operative to decode the buffered data when certain levels are achieved/maintained. Example decoded data is illustratively shown as header data 1110 and I/B/P frames or slices 1112 that may be provided to the display screen 1116 for forming images thereon. In channel changing conditions, on the other hand, the decoder/renderer 1108 is forced to process the video buffer data even if there is only a minimum amount of data.

Based upon the foregoing Detailed Description, it should be appreciated that the embodiments of the present disclosure can be advantageously implemented to facilitate channel changing in streaming environments. By pre-fetching certain initialization data in a predictive manner, a head start may be achieved in the overall media acquisition-decode-rendering process, thereby reducing the switching-induced delays that typically give rise to an unacceptable viewing experience. Accordingly, a channel surfing experience similar to one that is commonly expected in existing TV broadcast environments may be provided in an adaptive streaming network.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction relative to the depicted arrows.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method operative in a streaming client device disposed in an adaptive streaming environment, the method comprising:
    monitoring at least a bandwidth condition relative to a network connection between the streaming client device and a content delivery network;
    determining one or more adjacent channels relative to a current streaming channel of the streaming client device;
    pre-fetching metadata information associated with the one or more adjacent channels;
    responsive to the pre-fetched metadata information, pre-fetching and storing initialization information for the one or more adjacent channels;
    if the current streaming channel is changed to a new streaming channel belonging to the one or more adjacent channels, using the pre-fetched initialization information to fetch encoded media content pertaining to the new streaming channel, the encoded media content comprising shortest segments into which the encoded media content has been segmented by a segmentation server system associated with the content delivery network; and
    after determining that the new streaming channel has settled for a select time period, sending a request for streaming media content for the new streaming channel in segments larger than the shortest segments.

2. The method as recited in claim 1, wherein the monitoring further comprises monitoring at least one of video buffer conditions and decoder processing conditions of the streaming client device.

3. The method as recited in claim 1, wherein the metadata information comprises manifest information associated with the respective one or more adjacent channels.

4. The method as recited in claim 1, wherein the initialization information corresponding to the one or more adjacent channels comprises at least one of a Sequence Parameters Set (SPS), a Picture Parameters Set (PPS), one or more codec headers, and data necessary to decode slices of frames.

5. The method as recited in claim 4, wherein the one or more codec headers comprise at least one of MPEG-2 sequence headers, High Efficiency Video Coding (HEVC) headers, and AC3 (audio) headers.

6. The method as recited in claim 1, wherein the one or more adjacent channels are determined as at least one of a first number of consecutive channels above the current streaming channel and a second number of consecutive channels below the current streaming channel, and further wherein the first number and the second number respectively range from 0 to a quantity based on the network bandwidth condition.

7. The method as recited in claim 1, wherein the one or more adjacent channels are determined as a group of streaming channels that belong to a content category to which the current streaming channel also belongs.

8. The method as recited in claim 1, wherein the one or more adjacent channels are determined based on predicting a user's behavioral patterns in a "channel surfing" mode when using the streaming client device.

9. The method as recited in claim 8, wherein the "channel surfing" mode is ascertained responsive to detecting that the user has changed a plurality of channels within a select time period.

10. The method as recited in claim 1, further comprising:
    using the pre-fetched initialization information, pre-fetching encoded media content of the respective one or more adjacent channels;
    pre-decoding the encoded media content; and
    if the current streaming channel is changed to a new streaming channel belonging to the one or more adjacent channels, rendering the pre-decoded media content to be displayed immediately.

11. The method as recited in claim 10, wherein the pre-fetched media content of the respective one or more adjacent channels comprises media content segments encoded at a low bit rate.

12. The method as recited in claim 11, further comprising:
    sending a request for streaming media content encoded at higher bit rates; and
    continuing to monitor at least one of the bandwidth conditions of the network connection, video buffer conditions and decoder processing conditions, to determine one or more additional adjacent channels relative to the new streaming channel.

13. A client device, comprising:
    one or more processors;
    a bandwidth condition monitor; and
    a streaming client module coupled to the one or more processors, wherein the streaming client module includes instructions executable by one or more processors and configured to:

determine one or more adjacent channels relative to a current streaming channel of the client device, the one or more adjacent channels being determined responsive to monitoring by the bandwidth condition monitor relative to a network connection between the client device and a content delivery network;

pre-fetch metadata information associated with the one or more adjacent channels;

responsive to the pre-fetched metadata information, pre-fetch and store initialization information for the one or more adjacent channels;

if the current streaming channel is changed to a new streaming channel, use the pre-fetched initialization information to fetch encoded media content pertaining to the new streaming channel, the encoded media content comprising shortest segments into which the encoded media content has been segmented by a segmentation server system associated with the content delivery network; and after determining that the new streaming channel has settled for a select time period, sending a request for streaming media content for the new streaming channel in segments larger than the shortest segments.

14. The client device as recited in claim 13, further comprising a video buffer monitor for monitoring buffer conditions and wherein the one or more adjacent channels are determined further responsive to at least one of the buffer conditions and decoder processing conditions of the client device.

15. The client device as recited in claim 13, wherein the metadata information comprises manifest information associated with the respective one or more adjacent channels.

16. The client device as recited in claim 13, wherein the initialization information corresponding to the one or more adjacent channels comprises at least one of a Sequence Parameters Set (SPS), a Picture Parameters Set (PPS), one or more codec headers, and data necessary to decode slices of frames.

17. The client device as recited in claim 16, wherein the one or more codec headers comprise at least one of MPEG-2 sequence headers, High Efficiency Video Coding (HEVC) headers, and AC3 (audio) headers.

18. The client device as recited in claim 13, wherein the one or more adjacent channels are determined as at least one of a first number of consecutive channels above the current streaming channel and a second number of consecutive channels below the current streaming channel, and further wherein the first number and the second number respectively range from 0 to a quantity based on the network connection's bandwidth condition.

19. The client device as recited in claim 13, wherein the one or more adjacent channels are determined as a group of streaming channels that belong to a content category to which the current streaming channel also belongs.

20. The client device as recited in claim 13, wherein the one or more adjacent channels are determined based on predicting a user's behavioral patterns in a "channel surfing" mode when using the client device.

21. The client device as recited in claim 20, wherein the "channel surfing" mode is ascertained responsive to detecting that the user has changed a plurality of channels within a select time period.

22. The client device as recited in claim 13, wherein the streaming client module further comprises instructions configured to:

pre-fetch encoded media content of the respective one or more adjacent channels using the pre-fetched initialization information;

pre-decode the encoded media content; and render the pre-decoded media content to be displayed immediately if the current streaming channel is changed to a new streaming channel belonging to the one or more adjacent channels.

23. The client device as recited in claim 22, wherein the pre-fetched media content of the respective one or more adjacent channels comprises media content segments encoded at a low bit rate.

24. The client device as recited in claim 23, wherein the streaming client module further comprises instructions configured to:

send a request for streaming media content encoded at higher bit rates; and continue to monitor at least one of the bandwidth conditions of the network connection, video buffer conditions and decoder processing conditions, to determine one or more additional adjacent channels relative to the new streaming channel.

\* \* \* \* \*